United States Patent
Matthews

(10) Patent No.: US 7,100,378 B2
(45) Date of Patent: Sep. 5, 2006

(54) METHOD AND APPARATUS FOR CONTROLLING FUEL FLOW TO AN ENGINE

(75) Inventor: Peter John David Matthews, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 11/384,274

(22) Filed: Mar. 21, 2006

(65) Prior Publication Data

US 2006/0156736 A1    Jul. 20, 2006

Related U.S. Application Data

(62) Division of application No. 10/717,627, filed on Nov. 21, 2003, now Pat. No. 7,043,896.

(51) Int. Cl.
*F02C 9/26* (2006.01)

(52) U.S. Cl. ..................................... 60/779

(58) Field of Classification Search ............. 60/39.091, 60/39.281, 243, 772, 779
See application file for complete search history.

(56) References Cited

U.S. PATENT DOCUMENTS

| | | | |
|---|---|---|---|
| 4,032,757 A | 6/1977 | Eccles | |
| 4,058,978 A | 11/1977 | Bocklmann et al. | |
| 4,185,460 A | 1/1980 | Moore et al. | |
| 4,292,658 A | 9/1981 | Locher | |
| 4,297,742 A | 10/1981 | Heitzman et al. | |
| 4,494,208 A | 1/1985 | Chang | |
| 4,702,070 A | 10/1987 | Cureton et al. | |
| 4,716,531 A | 12/1987 | Saunders et al. | |
| 4,793,133 A | 12/1988 | White et al. | |
| 4,794,755 A | 1/1989 | Hutto, Jr. et al. | |
| 4,821,193 A | 4/1989 | Barber et al. | |
| 5,315,818 A * | 5/1994 | Smith ...................... 60/39.281 | |
| 5,322,041 A | 6/1994 | Niemeier et al. | |
| 5,440,490 A | 8/1995 | Summerfield | |
| 5,927,064 A | 7/1999 | Dyer et al. | |
| 6,176,074 B1 | 1/2001 | Thompson et al. | |
| 6,205,766 B1 | 3/2001 | Dixon et al. | |
| 6,293,085 B1 | 9/2001 | Thompson et al. | |
| 2002/0184884 A1 | 12/2002 | McCarty | |
| 2003/0056494 A1* | 3/2003 | Coleman ...................... 60/239 | |
| 2004/0200206 A1* | 10/2004 | McKelvey et al. ...... 60/39.281 | |

FOREIGN PATENT DOCUMENTS

| | | |
|---|---|---|
| EP | 0 915 241 | 5/1999 |
| JP | 10-145959 | 5/1998 |
| WO | WO 02/01055 | 1/2002 |

* cited by examiner

*Primary Examiner*—Louis J. Casaregola
(74) *Attorney, Agent, or Firm*—Ogilvy Renault LLP

(57) ABSTRACT

A method for selectively interrupting fuel flow to an engine. The method comprises: in a normal mode, enabling a normal interruption signal for interrupting the fuel flow in response to a normal shutdown signal; and in an emergency mode, enabling an emergency interruption signal for interrupting the fuel flow in response to at least the normal shutdown signal and an emergency shutdown signal having transient characteristics. The normal shutdown signal has a given normal value and the emergency shutdown signal has a peak value substantially larger than the given normal value, whereby the fuel flow interrupting occurs faster in response to the emergency shutdown signal than in response to the normal shutdown signal.

3 Claims, 4 Drawing Sheets

METHOD AND APPARATUS FOR CONTROLLING FUEL FLOW TO AN ENGINE

CROSS-REFERENCE TO RELATED APPLICATIONS

The present application is a divisional of U.S. application Ser. No. 10/717,627 filed Nov. 21, 2003, which is presently pending, the specification of which is hereby incorporated by reference.

FIELD OF THE INVENTION

The present invention relates to the field of gas turbine engines and, more specifically, it concerns methods and devices for controlling fuel flow to them.

BACKGROUND OF THE INVENTION

Turbine and other rotary engines often have several wholly or partly independent means of interrupting the fuel flow in order to shut down the engine. A first means of shutdown is a normal shutdown means, another one may be an automatic overspeed shutdown means, and yet another may be an especially fast (emergency) shutdown means needed in case part of the engine breaks. It is generally easy to arrange for consolidation of several of these means for shutdown with some form of electronic or other logic device to control one or more solenoid type fuel shut-off valves.

However, there is also a need to ensure that one or more means can operate independently of these electronic or other logic devices. Also, the need for a fast (emergency) shutdown is normally incompatible with the need to have a permanent shutdown command if both are implemented via a single solenoid fuel shut-off valve. There is therefore a requirement in the industry for a solution to this particular problem.

SUMMARY OF THE INVENTION

In one of its embodiments, the present invention relates to an engine shutdown device for controlling a fuel shut-off valve to thereby selectively interrupt fuel flow to an engine. The device comprises a normal switch connected to the fuel shut-off valve and configured to respond to at least one of a normal shutdown signal and an emergency shutdown signal having transient characteristics. The device further comprises an emergency switch connected to the fuel shut-off valve and configured to respond to the emergency shutdown signal. Upon receipt of the emergency shutdown signal, the emergency switch sends an emergency interruption signal to the valve and the normal switch sends a normal interruption signal to the valve to thereby interrupt the fuel flow. The normal interruption signal has a given normal value and the emergency interruption signal has a peak value substantially larger than the given normal value, whereby the fuel flow interrupting occurs faster in response to the emergency shutdown signal than in response to the normal shutdown signal.

Alternatively, the engine shutdown device may additionally comprise a manual switch connected to the fuel shut-off valve for selectively interrupting the fuel flow in response to a manual shutdown signal being independent of the normal shutdown signal and the emergency shutdown signal.

In another embodiment, the present invention relates to a gas turbine engine incorporating the foregoing engine shutdown device.

In yet another embodiment, the present invention relates to a method for selectively interrupting fuel flow to an engine. The method comprises: in a normal mode, enabling a normal interruption signal for interrupting the fuel flow in response to a normal shutdown signal; and in an emergency mode, enabling an emergency interruption signal for interrupting the fuel flow in response to at least the normal shutdown signal and an emergency shutdown signal having transient characteristics. The normal shutdown signal has a given normal value and the emergency shutdown signal has a peak value substantially larger than the given normal value, whereby the fuel flow interrupting occurs faster in response to the emergency shutdown signal than in response to the normal shutdown signal.

DESCRIPTION OF THE PREFERRED EMBODIMENT

Figure 1:
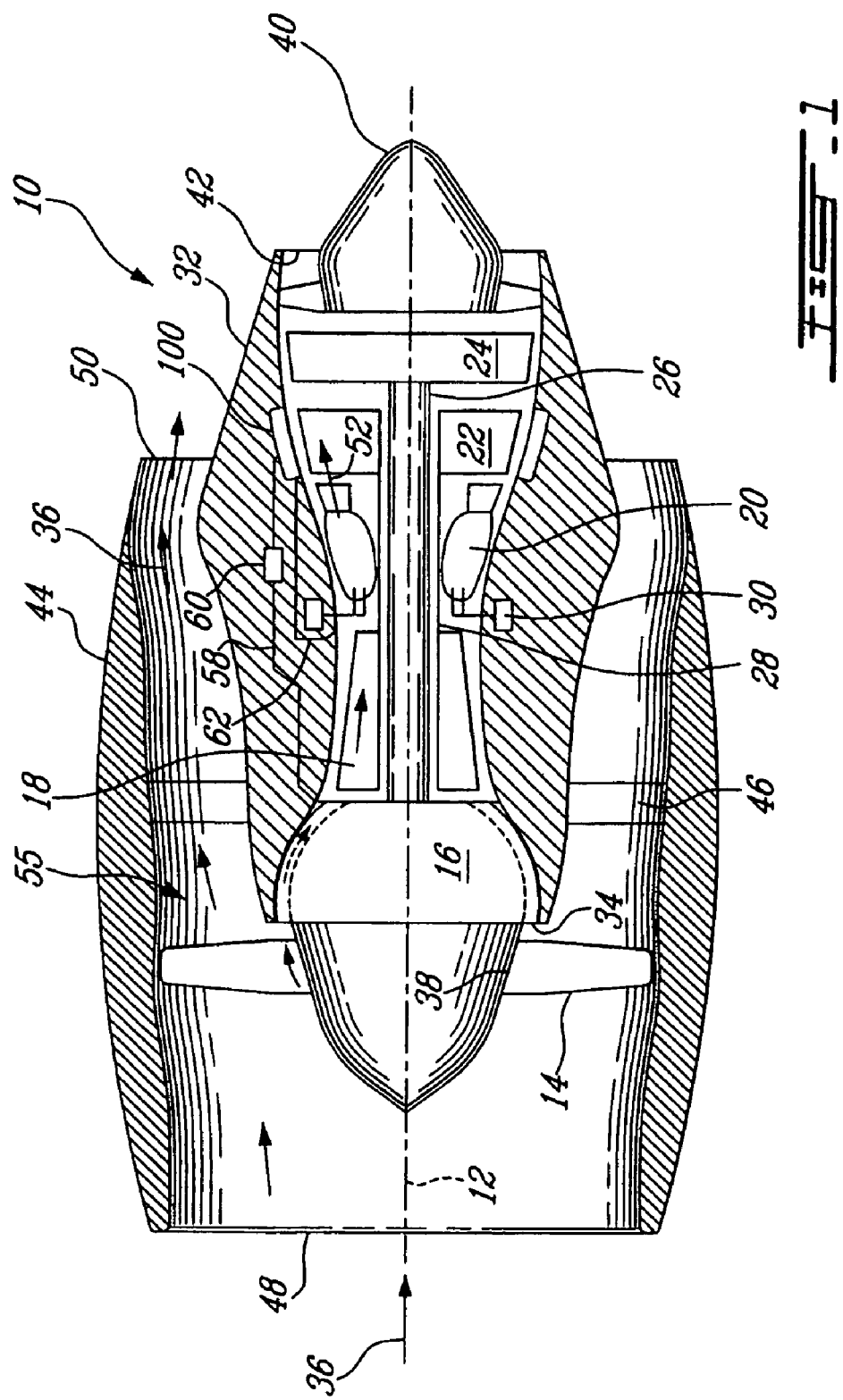
FIG. 1 is a longitudinal cross-sectional schematic view of a gas turbine engine incorporating the present invention in accordance with one of its embodiments.

Referring to the drawings, particularly FIG. 1, a exemplary gas turbine engine 10 includes in serial flow communication about a longitudinal central axis 12, a fan having a plurality of circumferentially spaced apart fan or rotor blades 14, a conventional low pressure 18, a conventional annular combustor 20, a high pressure turbine 22 which includes a turbine shroud support configuration 100 according to one embodiment of the present invention, and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injecting means 30 are provided for selectively injecting fuel into the combustor 20, for powering the engine 10.

A conventional annular casing 32 surrounds the engine 10 from the low pressure compressor 16 to the low pressure turbine 24, and defines, with the low pressure compressor 16, a low pressure compressor inlet 34 for receiving a portion of ambient air 36. The downstream end of the casing 32 defines with a conventional annular exhaust plug 40, an annular exhaust outlet 42. A portion of the air 36 compressed by the fan blades 14 adjacent to the blade roots 38, is further compressed by the low pressure compressor 16 and the high pressure compressor 18, to be forced into the combustor 20. The mixture of the compressed air 36 and the fuel injected by the fuel injecting means 30, generates combustion gases 52.

In a preferred embodiment, the fuel shut-off valve 202 (see FIGS. 2 and 3) will be located on a fuel line (not shown) feeding into fuel injecting means 30.

Figure 2:
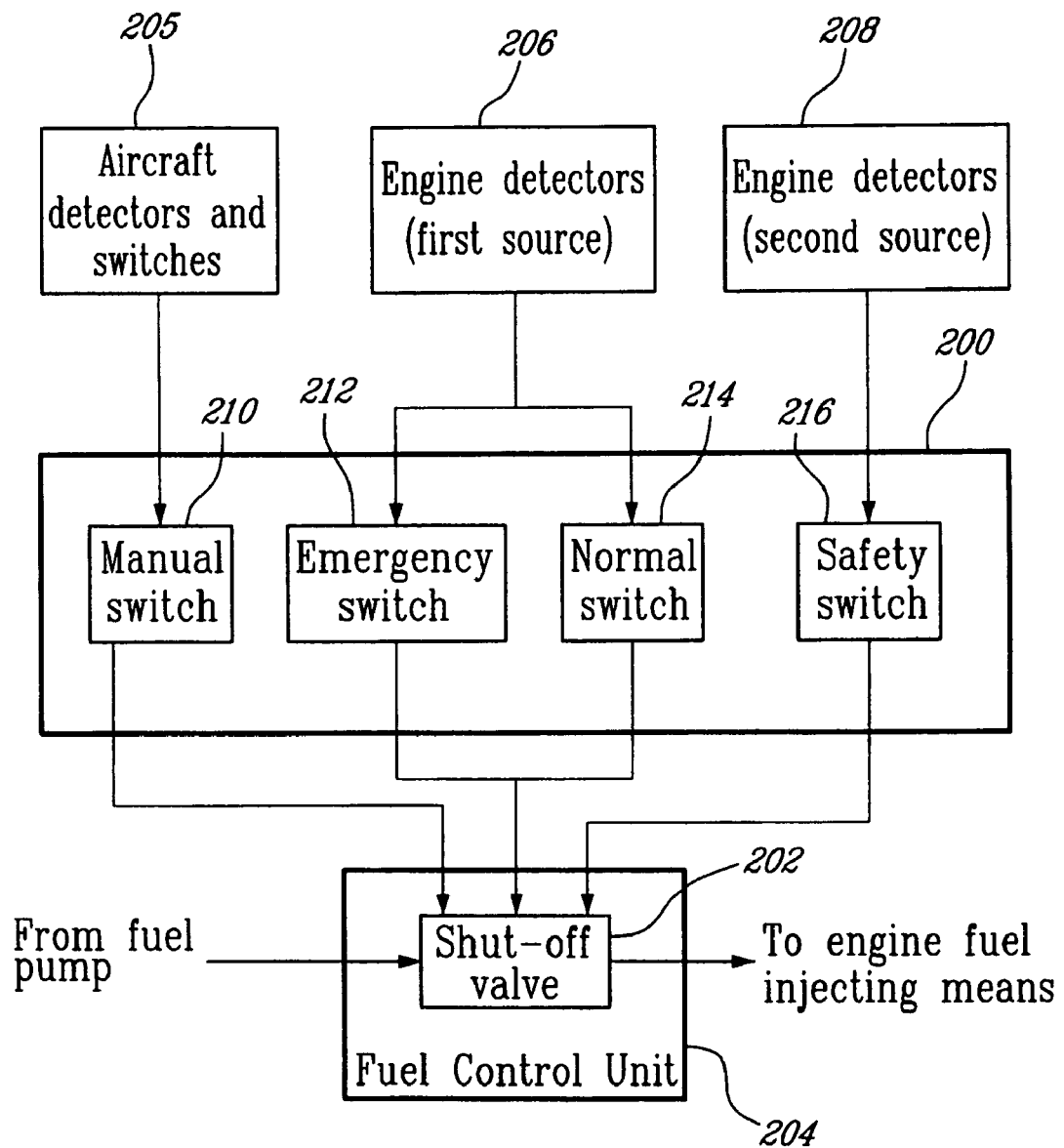
FIG. 2 is a block diagram of an engine shutdown device according to an embodiment of the invention.

Referring to FIG. 2, an engine shutdown device 200 according to an embodiment of the invention is described.

The engine shutdown device 200 controls the shut-off valve 202 of the Fuel Control Unit FCU 204 in response to various engine and aircraft detectors 205, 206, 208. Examples of engine detectors 206, 208 include, but are not limited to, overspeed detectors for any of the engine rotating components, an engine shaft shear detection unit, etc. Examples of aircraft detectors 205 include, but are not limited to, manual mechanical switches, fire extinguishing switches or detectors, etc. A person skilled in the art will understand that any number of aircraft detectors 205 may be wired identically and operating in parallel such that any of them could produce a shutdown of engine 10.

In FIG. 2, a first 206 and a second 208 source of engine detectors are shown. Having two sources facilitates dual channel logic. The normal switch 214 and/or the emergency switch 212 (channel 1) must agree prior to shutting-off fuel to engine 10. Alternatively, the safety switch 216 (channel 2) may be used to shut-off fuel to engine 10. The second source 208 and the safety switch 216 are therefore optional if dual channel logic is not necessary for the particular application.

The present invention may also include other types of units that control fuel delivery to the engine 10 such as Fuel Management Units, Hydromechanical Units, etc. In a preferred embodiment, the shut-off valve may include a shut down coil comprising a solenoid plunger. The solenoid plunger operates a small mechanical valve which controls a servo pressure on one of the valves controlling the main engine fuel burn flow.

The engine shutdown device 200 comprises a normal switch 214 connected to fuel shut-off valve 202. The normal switch 214 is configured to respond to a normal shutdown signal and an emergency shutdown signal from the engine detectors 206. The emergency shutdown signal is transient in nature and therefore includes, but is not limited to, a square pulse signal.

The engine shutdown device 200 also comprises an emergency switch 212 connected to fuel shut-off valve 202. The emergency switch 212 is configured to respond to any emergency shutdown signal from the engine detectors 206.

Upon receipt of an emergency shutdown signal, emergency switch 212 sends an emergency interruption signal and normal switch 214 sends a normal interruption signal to valve 202 to thereby interrupt fuel flow to engine 10. In a preferred embodiment, the normal interruption signal has a given normal value, and the emergency interruption signal has a peak value substantially larger than the given normal value. The result of having such a difference in the peak value of the emergency interruption signal and the normal value of the normal interruption signal is that fuel flow interruption will occur faster in response to the emergency shutdown signal than in response to the normal shutdown signal.

The engine shutdown device 200 also comprises a manual switch 210 connected to fuel shut-off valve 202. Manual switch 210 may be configured to respond to a manual shutdown signal from any aircraft detectors and/or switches. Manual switch 210 therefore selectively interrupts fuel flow independently of the normal shutdown signal and the emergency shutdown signal.

Figure 3:
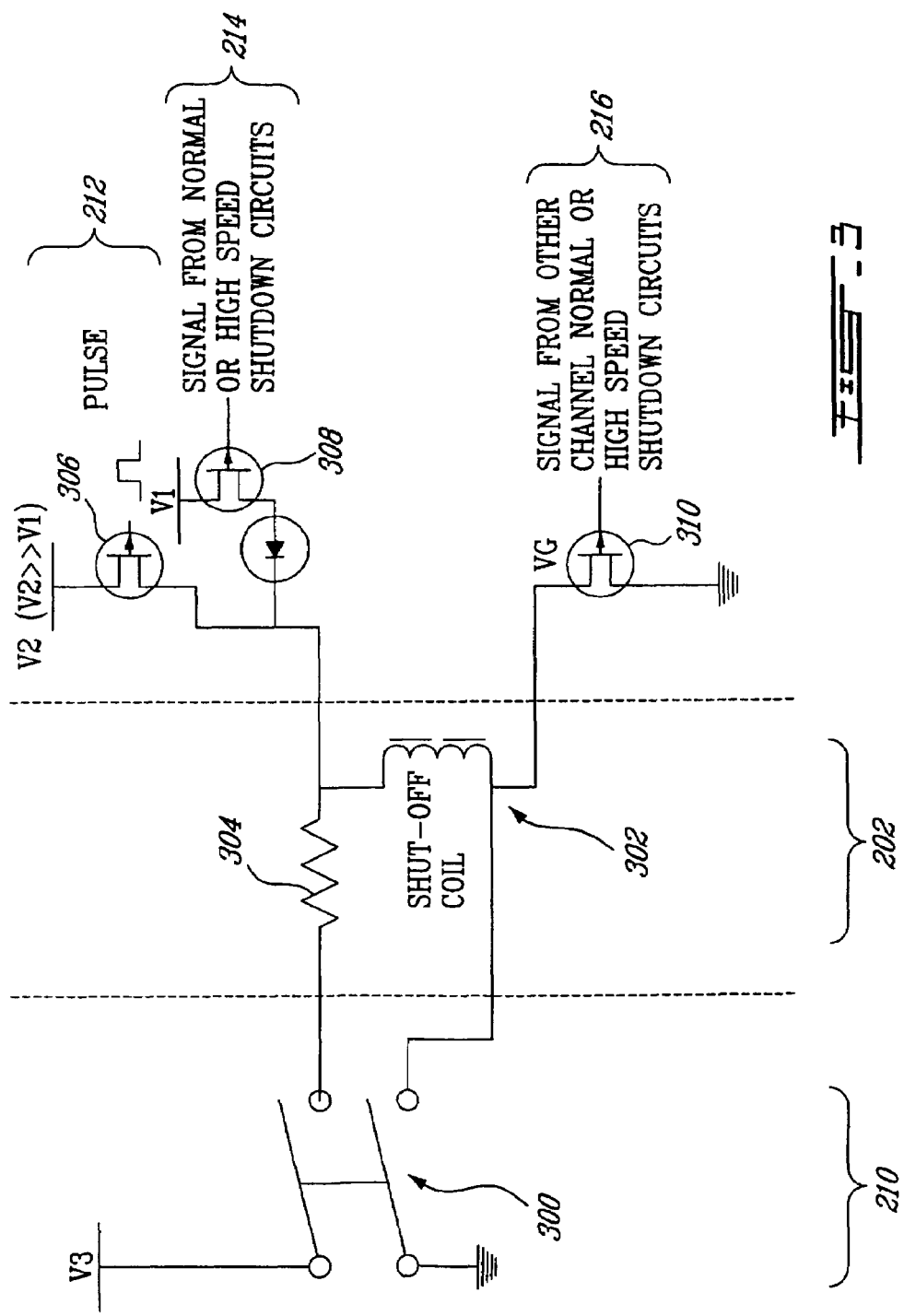
FIG. 3 is an electrical schematic diagram showing an exemplary embodiment of the invention using transistor switches.

FIG. 3 is a electrical schematic diagram showing an exemplary embodiment of the invention using transistor switches (306, 308, 310). Other types of switches could be used depending on speed and other requirements. FIG. 3 corresponds to a preferred embodiment of the engine shutdown device 200 described with FIG. 2. In FIG. 3, manual mechanical switch 300 corresponds to manual switch 210, shut-off coil 302 and resistor 304 correspond to shut-off valve 202, transistor 306 corresponds to emergency switch 212, transistor 308 corresponds to normal switch 214, and transistor 310 corresponds to safety switch 216.

The engine shutdown device 200 of the present invention operates in one of three different modes: 1—a manual mode; 2—a normal (or overspeed) mode; and 3—an emergency mode. In the event of an overspeed (mode 2), the transistors to the V1 rail (308) and to ground (310) are turned on. Transistor 310 is optional as discussed herein. There is a given voltage Vos for which shut-off coil 302 will both respond quickly enough for an overspeed shutdown, and still be able to sustain this energization indefinitely.

In an exemplary embodiment, a manual mechanical switch 300 (for use in mode 1) connects a V3 supply to the coil which must be greater or equal to Vos. In the event that V3 is greater than Vos, a resistor 304 is fitted in shut-off coil 302 to limit the current in it. As is shown in FIG. 3, this means of shutdown is independent from the system logic of the other parts of engine shutdown device 200.

If an event occurs requiring faster shutdown than the shut-off coil 302 can naturally provide (mode 3), the transistors for overspeed (308, 310) are turned on and, in addition, the transistor 306 to the V2 rail is also turned on transiently. Since V2 is much greater than V1, the current in shut-off coil 302 is very rapidly driven to the shutdown value, and a very rapid shutdown of the fuel occurs The V2 transistor 306 is turned off after the shutdown has occurred to avoid overheat in shut-off coil 302 or transistors 306 and 310. The V1 transistor 308 provides the sustaining current to keep the fuel supply in an interrupted state.

The circuit as shown in FIG. 3 facilitates dual channel logic. That is, both channels (to V1 transistor 308 and to Vg transistor 310) must agree to cause shutting-off of the fuel. If this functionality is not needed, transistor 310 may be replaced by a short circuit.

In a preferred embodiment, exemplary values for the components of FIG. 3 are:
V3 supply 28 vdc nominal
V2 supply 30 vdc nominal
V1 supply 10 vdc nominal
8 vdc min
Coil 302 Pull in volts 8 vdc max
Coil 302 drop out volts 3 vdc min
Coil 302 resistance 40 ohm max–10 ohm min FIG. 3 shows the switches (306, 308, 310) as FET transistors, however the circuit is implementable with different types of switches. For example, bipolar transistors or electromechanical switches could be used. Depending on the choice of switch type, and the current and voltage levels used, additional components may be necessary.

Furthermore, the power supply V2 need not necessarily be a conventional steady supply. Instead of this and a pulse commanding the 'V2 transistor' on, a self timing pump circuit could be used. Such a circuit 400 is shown in FIG. 4.

Figure 4:
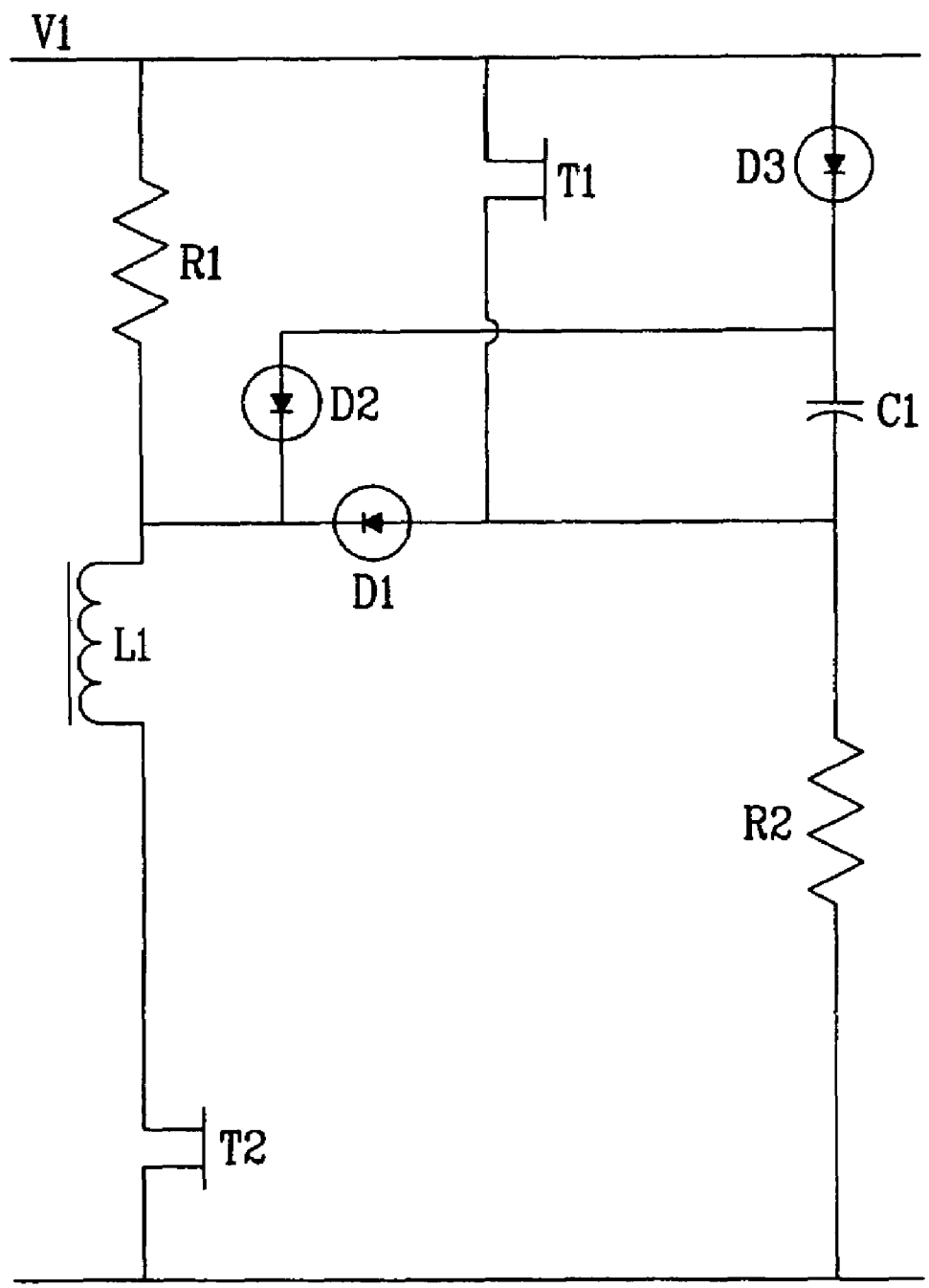
FIG. 4 is an electrical schematic diagram showing an embodiment of a self timing pump circuit to replace power supply of FIG. 3.

In FIG. 4, transistors T1 and T2 are equivalent to V1 transistor 308 and to Vg transistor 310. When transistors T1 and T2 are turned on, the charge accumulated in capacitor C1 is passed to coil L1, which is the equivalent of shutdown coil 302. In the quiescent state, circuit 400 operates as follows. Transistors T1 and T2 are off, capacitor C1 has V1 volts across it, having charged up through diode D3 and resistor R2, and the high side of coil L1 is also at V1. When transistors T1 and T2 turn on, the low side of capacitor C1 is lifted to voltage V1 (approximately) by transistor T1, putting the high side of capacitor C1 at two times V1 (approximately). Capacitor C1 then discharges into coil L1 via diode D1. When capacitor C1 has discharged, the current to keep coil L1 energized is supplied by transistor T1. Note that, for simplification purposes, the optional aircraft switch 300 (FIG. 3) or 210 (FIG. 2) is not included FIG. 4. Were switch 300 to be used, its operation would be in accordance with the description above.

In a preferred embodiment, exemplary values for the components of FIG. 4 are:

V1 supply 10 vdc nominal
8 vdc min
L1 Coil Pull in volts 8 vdc max
L1 Coil drop out volts 3 vdc min
L1 Coil resistance 40 ohms max–10 ohms min
R1 100 kohms
R2 10 kohms
C1 2000 microFarads Although the present invention has been described hereinabove by way of preferred embodiments thereof, it can be modified, without departing from the spirit and nature of the subject invention as defined in the appended claims.

The invention claimed is:

1. A method for selectively interrupting fuel flow to an engine, said method comprising:

in a normal mode, enabling a normal interruption signal for interrupting said fuel flow in response to a normal shutdown signal;

in an emergency mode, enabling an emergency interruption signal and said normal interruption signal for interrupting said fuel flow in response to at least one of said normal shutdown signal and an emergency shutdown signal having transient characteristics;

said normal interruption signal having a given normal value and said emergency interruption signal having a peak value substantially larger than said given normal value, whereby said fuel flow interrupting occurs faster in response to said emergency shutdown signal than in response to said normal shutdown signal.

2. The method of claim 1, further comprising, in a manual mode, selectively interrupting said fuel flow independently of said normal shutdown signal and said emergency shutdown signal.

3. The method of claim 1, further comprising, in a dual channel mode, interrupting said fuel flow only when at least of a second normal shutdown signal and a second emergency shutdown signal are substantially equal to said normal and emergency shutdown signals, said second normal and emergency shutdown signals being provided from a source which is different from a source for said normal and emergency shutdown signals.

* * * * *